United States Patent
Lu et al.

(10) Patent No.: US 11,924,301 B2
(45) Date of Patent: Mar. 5, 2024

(54) NETWORK NODES AND METHODS THEREIN FOR INDIRECT COMMUNICATION

(71) Applicant: Telefonaktiebolaget LM Ericsson (publ), Stockholm (SE)

(72) Inventors: Yunjie Lu, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/019,833

(22) PCT Filed: Dec. 7, 2020

(86) PCT No.: PCT/CN2020/134182
§ 371 (c)(1),
(2) Date: Feb. 6, 2023

(87) PCT Pub. No.: WO2022/027887
PCT Pub. Date: Feb. 10, 2022

(65) Prior Publication Data
US 2023/0291809 A1     Sep. 14, 2023

(30) Foreign Application Priority Data

Aug. 7, 2020    (WO) ................ PCT/CN2020/107899

(51) Int. Cl.
*G06F 15/16*     (2006.01)
*H04L 67/2871*     (2022.01)
*H04L 67/563*     (2022.01)

(52) U.S. Cl.
CPC ........ *H04L 67/563* (2022.05); *H04L 67/2871* (2013.01)

(58) Field of Classification Search
CPC .......................... H04L 67/563; H04L 67/2871
See application file for complete search history.

(56) References Cited

U.S. PATENT DOCUMENTS

| | | |
|---|---|---|
| 2019/0081942 A1 | 3/2019 | Suresh |
| 2020/0007632 A1 | 1/2020 | Landais et al. |

(Continued)

FOREIGN PATENT DOCUMENTS

WO     2022027888 A1    2/2022

OTHER PUBLICATIONS

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.

(Continued)

*Primary Examiner* — Hieu T Hoang
(74) *Attorney, Agent, or Firm* — Withrow & Terranova, PLLC (57) ABSTRACT

The present disclosure provides a method in a network node implementing a Service Communication Proxy, SCP, function. The method includes: receiving, from a first Network Function, NF, a request destined to a second NF, wherein the request comprises information on the second NF; redirecting the request to a third NF, wherein the redirected request comprises information on the third NF; and transmitting a response to the first NF, wherein the response comprises the information on the third NF.

11 Claims, 5 Drawing Sheets

(56) References Cited

U.S. PATENT DOCUMENTS

| | | | |
|---|---|---|---|
| 2021/0168215 A1 | 6/2021 | Zong et al. | |
| 2021/0258406 A1* | 8/2021 | Ali | H04W 68/005 |
| 2021/0306203 A1* | 9/2021 | Landais | H04L 67/63 |
| 2022/0014888 A1 | 1/2022 | Bykampadi et al. | |
| 2022/0132454 A1 | 4/2022 | Youn et al. | |
| 2023/0035572 A1 | 2/2023 | Belling et al. | |

OTHER PUBLICATIONS

Author Unknown, "Technical Specification Group Services and System Aspects; Procedures for the 5G System (5GS); Stage 2 (Release 16)," Technical Specification 23.502, Version 16.4.0, Mar. 2020, 3GPP Organizational Partners, 582 pages.

Author Unknown, "Technical Specification Group Core Network and Terminals; 5G System; Technical Realization of Service Based Architecture; Stage 3 (Release 16)," Technical Specification 29.500, Version 16.3.0, Mar. 2020, 3GPP Organizational Partners, 65 pages.

Author Unknown, "Technical Specification Group Core Network and Terminals; 5G System; Technical Realization of Service Based Architecture; Stage 3 (Release 16)," Technical Specification 29.500, Version 16.4.0, Jun. 2020, 3GPP Organizational Partners, 80 pages.

Author Unknown, "Technical Specification Group Core Network and Terminals; 5G System; Network Function Repository Services; Stage 3 (Release 16)," Technical Specification 29.510, Version 16.3.0, Mar. 2020, 3GPP Organizational Partners, 172 pages.

Author Unknown, "Technical Specification Group Core Network and Terminals; 5G System; Network Function Repository Services; Stage 3 (Release 16)," Technical Specification 29.510, Version 16.4.0, Jul. 2020, 3GPP Organizational Partners, 192 pages.

International Search Report and Written Opinion for International Patent Application No. PCT/CN2020/134268, dated Apr. 9, 2021, 21 pages.

International Preliminary Report on Patentability for International Patent Application No. PCT/CN2020/134268, dated Oct. 21, 2022, 29 pages.

International Search Report and Written Opinion for International Patent Application No. PCT/CN2020/134182, dated Feb. 19, 2021, 15 pages.

International Preliminary Report on Patentability for International Patent Application No. PCT/CN2020/134182, dated Sep. 6, 2022, 18 pages.

Non-Final Office Action for U.S. Appl. No. 18/019,590, dated Dec. 21, 2023, 16 pages.

* cited by examiner

NETWORK NODES AND METHODS THEREIN FOR INDIRECT COMMUNICATION

This application is a 35 U.S.C. § 371 national phase filing of International Application No. PCT/CN2020/134182, filed Dec. 7, 2020, which claims the benefit of International Application No. PCT/CN2020/107899, filed Aug. 7, 2020, the disclosures of which are incorporated herein by reference in their entireties.

TECHNICAL FIELD

The present disclosure relates to communication technology, and more particularly, to networks and methods therein for indirect communication.

BACKGROUND

In Release 16 (Rel-16), the $3^{rd}$ Generation Partnership Project (3GPP) has further broaden the use of Network Function (NF) Set concept to be applicable for all types of NFs in the $5^{th}$ Generation (5G) Core.

In Rel-16, as part of Network Function Service Framework, "Indirect Communication" is defined in clause 7.1.1 in the 3GPP Technical Specification (TS) 23.501, V16.4.0, which is incorporated herein by reference in its entirety. NF services may communicate directly between NF service consumers (or referred to as NF consumers) and NF service producers (or referred to as NF producers), or indirectly via a Service Communication Proxy (SCP).

As specified in clause 5.21.3.1 of TS 23.501, several NF instances can be deployed within an NF Set to provide distribution, redundancy and scalability together as a set of NF instances. In this case, an NF can be replaced with an alternative NF within the same NF Set in case of failure, load balancing, or load re-balancing. This applies for both service operations and notification delivery.

Accordingly, a service (or notification) may be continued on an alternative NF, e.g., when the original NF has failed, overloaded, etc. The reselection can be performed by an NF consumer (or NF producer) or an SCP (for indirect communication).

Table 6.3.1.0-1 in TS 23.501, reproduced as Table 1 below, defines the selection and reselection behaviors of NF services consumers and SCPs depending on the Binding Indication provided by an NF service producer.

TABLE 1

| | | | |
|---|---|---|---|
| Binding, selection and reselection | | | |
| Level of Binding Indication | The NF Consumer/ Notification sender/ SCP selects | The NF Consumer/ Notification sender/ SCP can reselect e.g. when selected producer is not available | Binding information for selection and re-selection |
| NF Service Instance | The indicated NF Service Instance | An equivalent NF Service instance: within the NF Service Set (if applicable) within the NF instance within the NF Set (if applicable) | NF Service Instance ID, NF Service Set ID, NF Instance ID, NF Set ID, Service name |
| NF Service Set | Any NF Service instance within the indicated NF Service Set | Any NF Service instance within an equivalent NF Service Set within the NF Set (if applicable) | NF Service Set ID, NF Instance ID, NF Set ID, Service name |
| NF Instance | Any equivalent NF Service instance within the NF instance. | Any equivalent NF Service instance within a different NF instance within the NF Set (if applicable) | NF Instance ID, NF Set ID, Service name |
| NF Set | Any equivalent NF Service instance within the indicated NF Set | Any equivalent NF Service instance within the NF Set | NF Set ID, Service name |

The 3GPP TS 29.500, V16.3.0, which is incorporated herein by reference in its entirety, specifies the NF and SCP behaviors of handling an Application Programming Interface (API) root (apiRoot) in case of indirect communications.

Clause 6.10.2.4 of TS 29.500 specifies pseudo-header setting for indirect communications. In particular, for Indirect Communications with or without delegated discovery, when sending a request to an SCP, a Hyper Text Transfer Protocol (HTTP) client shall set the pseudo-headers as follows:

":scheme" set to "http" or "https";

":authority" set to the Fully Qualified Domain Name (FQDN) or Internet Protocol (IP) address of the SCP (if the scheme is "http"), or to the FQDN of the SCP (if the scheme is "https");

":path" including the optional deployment-specific string of the SCP and the path and query components of the target Uniform Resource Identifier (URI) excluding the optional deployment-specific string of the target URI.

An HTTP client sending a notification or callback request cannot know whether the callback URI contains any deployment specific string or not. Accordingly, it shall behave assuming that there is no deployment specific string in the callback (i.e. target) URI.

Additionally, for HTTP requests for which an HTTP client may cache responses (e.g. GET request), the HTTP client should include the cache key (ck) query parameter set to an implementation specific value that is bound to the target NF.

The HTTP client shall include the apiRoot of an authority server for the target resource (including the optional deployment-specific string of the target URI), if available, in the 3gpp-Sbi-Target-apiRoot header.

When forwarding a request to the HTTP server, the SCP shall replace the apiRoot of the SCP received in the request URI of the incoming request with the apiRoot of the target NF service instance. If the 3gpp-Sbi-Target-apiRoot header was received in the request, the SCP shall use it as the apiRoot of the target NF service instance, if the SCP does not (re)select a different HTTP server, and regardless shall remove it from the forwarded request. The SCP shall set the pseudo-headers as specified in clause 6.1, with the following additions:

the SCP shall modify the ":authority" HTTP/2 pseudo-header field to the FQDN of the target NF service instance.

the SCP shall remove any optional deployment-specific string of the SCP in the ":path" HTTP/2 pseudo-header and add any optional deployment-specific string of the target URI;

the SCP shall remove the cache key query parameter, if this parameter was received in the request.

In an example, for indirect communication without delegated discovery, if the NF Service Consumer needs to send the request "POST https://example.com/a/b/c/nsmf-pdusession/v1/sm-contexts/{smContextRef}/modify" to the NF Service Producer (represented by the FQDN "example.com" and where "a/b/c" is the apiPrefix of the NF service producer figured out from NF discovery):

the NF service consumer shall send the request "POST https://scp.com/1/2/3/nsmf-pdusession/v1/sm-contexts/{smContextRef}/modify" to the SCP (where "1/2/3" is the "apiPrefix" of the SCP), with the "3gpp-sbi-target-apiRoot" header set to "https://example.com/a/b/c".

the SCP shall send the request "POST https://example.com/a/b/c/nsmf-pdusession/v1/sm-contexts/{sm-ContextRef}/modify" to the NF Service Producer, without any "3gpp-sbi-target-apiRoot" header.

In another example, for indirect communication, if the NF Service Producer needs to send a notification request "POST https://example.com/a/b/c/notification" to the NF Service Consumer (represented by the FQDN "example.com", i.e. the host part of the callback URI):

the NF service producer shall send the request "POST https://scp.com/1/2/3/a/b/c/notification" to the SCP (where "1/2/3" is the "apiPrefix" of the SCP), with the "3gpp-sbi-target-apiRoot" header set to "https://example.com".

the SCP shall send the request "POST https://example.com/a/b/c/notification" to the NF Service Producer, without any "3gpp-sbi-target-apiRoot" header.

Clause 6.10.2.5 of TS 29.500 specifies 3gpp-Sbi-Target-apiRoot header setting. For indirect communications with or without delegated discovery, the HTTP client shall include a 3gpp-Sbi-Target-apiRoot header set to the apiRoot of an authority server for the target resource, if available, in requests it sends to the SCP. In particular:

for Indirect Communication without Delegated Discovery, a service request sent to the SCP to create a resource shall include a 3gpp-Sbi-Target-apiRoot header set to the apiRoot of the selected NF service instance of the NF Service Producer, if the NF Service Consumer has indeed selected a specific NF service instance;

after a resource has been created, subsequent service requests sent to the SCP and targeting the resource shall include a 3gpp-Sbi-Target-apiRoot header set to the apiRoot received earlier from the NF Service Producer;

notifications or callbacks sent via the SCP shall include the apiRoot of the notification or callback URI (i.e. "http" or "https" scheme, the fixed string "://" and authority (host and optional port)).

When forwarding the request to the HTTP server, the SCP shall set the pseudo-headers as specified in clause 6.10.2.4 of TS 29.500.

SUMMARY

When an NF consumer sends an initial request to an NF Producer to create a resource on the NF producer, e.g., when an Access and Mobility Management Function (AMF) requests to create a Protocol Data Unit (PDU) Session Management (SM) Context on a Session Management Function (SMF), an absolute URI (including API Root of the HTTP server hosting the resource) of the newly created resource will be returned in a "Location" header in a 201 Created HTTP response. The NF consumer then uses this URI for subsequent operations towards this resource. Similarly, an NF producer can get a notification URI from an NF consumer in a previous service operation triggering a subscription to the notification (implicitly or explicitly).

In the indirect communication, when an original NF receiver has failed or overloaded, or any other similar situation, an SCP may reselect another NF instance as a new NF receiver, or a subsequent request may be explicitly redirected by the original NF receiver to a another NF instance as a new NF receiver for load control or re-balancing. In these scenarios, the SCP uses the apiRoot of the new NF receiver in the request forwarded to the new NF receiver. An "NF sender" as used herein may refer to an NF consumer in case of service operations or an NF producer in case of notifications. An "NF receiver" as used herein may refer to an NF producer in case of service operations or an NF consumer in case of notifications.

The "Location" header with URI is only supported in a 201 Created for resource creation, or in a 307/308 redirection response which is only used by the SCP for the reselection scenario. The new apiRoot is only known by the SCP but not by the NF sender. For notifications, the callback URI is carried in a message body and can only be updated by the subscriber explicitly. Accordingly, the URI of the new NF receiver will not be sent to the NF sender, the NF sender, being unaware of the apiRoot of the new NF receiver, may still use the apiRoot of the original NF receiver for subsequent requests or notifications. The SCP, which is stateless, will then need to perform a reselection again, which would be totally unnecessary. Even worse, if the SCP reselects a different NF receiver other than the one that was previously selected, the resource may be restored again, which will lead to resource waste and conflicts.

It is an object of the present disclosure to provide network nodes and methods therein for indirect communication, capable of solving or mitigating at least one of the above problems.

According to a first aspect of the present disclosure, a method in a network node implementing an SCP function is provided. The method includes: receiving, from a first NF, a request destined to a second NF, the request including information on the second NF; redirecting the request to a third NF, the redirected request including information on the third NF; and transmitting a response to the first NF, the response including the information on the third NF.

In an embodiment, the request may be a request to update a resource at the second NF or a notification request.

In an embodiment, the information on the third NF may indicate an API root of the third NF.

In an embodiment, the information on the third NF may be carried in a URI in the redirected request or in a header in the response.

In an embodiment, the header may be a 3gpp-Sbi-Target-apiRoot header.

In an embodiment, the request destined to the second NF may contain: a URI having an API root of the SCP. The information on the second NF may indicate an API root of the second NF and may be carried in a 3gpp-Sbi-Target-apiRoot header.

In an embodiment, the operation of redirecting may include reselecting the third NF as a receiver of the request in response to failure, load balancing, or load rebalancing associated with the second NF, or may be in response to an indication from the second NF indicating redirection to the third NF.

In an embodiment, the operation of reselecting may include performing a discovery towards an NF Repository Function (NRF), and/or may be based on a binding indication associated with the second NF. The indication may further indicate the API root of the third NF.

In an embodiment, the first NF or second NF may be one of an HTTP server, an HTTP client, an NF service producer, or an NF service consumer.

According to a second aspect of the present disclosure, a method in a first NF is provided. The method includes: transmitting, to an SCP, a request destined to a second NF, the request including information on the second NF; and receiving a response from the SCP or from a third NF to which the request is redirected via the SCP, the response including information on the third NF.

In an embodiment, the request may be a request to update a resource at the second NF or a notification request.

In an embodiment, the information on the third NF may indicate an API root of the third NF.

In an embodiment, the information on the third NF may be carried in a URI or in a header in the response.

In an embodiment, the header may be a 3gpp-Sbi-Target-apiRoot header.

In an embodiment, the request destined to the second NF may contain: a URI having an API root of the SCP. The information on the second NF may indicate an API root of the second NF and may be carried in a 3gpp-Sbi-Target-apiRoot header.

In an embodiment, the method may further include: transmitting, to the SCP, a further request destined to the third NF. The further request may include the information on the third NF.

According to a third aspect of the present disclosure, a method in a third NF is provided. The method include: determining that a request from a first NF to a second NF via an SCP has been redirected to the third NF; and transmitting a response to the first NF via the SCP, the response including a URI having an API root of the third NF.

According to a fourth aspect of the present disclosure, a network node is provided. The network node includes a communication interface, a processor and a memory. The memory stores instructions executable by the processor whereby the network node is operative to, when implementing an SCP function, perform the method according to the above first aspect; or when implementing a first NF, perform the method according to the above second aspect; or when implementing a third NF, perform the method according to the above third aspect.

According to a fifth aspect of the present disclosure, a computer-readable storage medium is provided. The computer-readable storage medium has computer-readable instructions stored thereon. The computer-readable instructions, when executed by a processor of a network node, configure the network node to, when implementing an SCP function, perform the method according to the above first aspect; or when implementing a first NF, perform the method according to the above second aspect; or when implementing a third NF, perform the method according to the above third aspect.

With the embodiments of the present disclosure, after redirecting a request, which is received from a first NF and destined to a second NF, to a third NF, an SCP can include information on the third NF (e.g., an apiRoot of the third NF) in a response to be transmitted to the first NF. In this way, the first NF can be notified of the information and use it for subsequent service operations or notifications, such that the SCP does not need to perform redirection or reselection again for the subsequent service operations or notifications, which would otherwise cause resource waste and conflicts.

BRIEF DESCRIPTION OF THE DRAWINGS

The above and other objects, features and advantages will be more apparent from the following description of embodiments with reference to the figures, in which.

DETAILED DESCRIPTION

In the present disclosure, a network function, or NF, can be implemented either as a network element on a dedicated hardware, as a software instance running on a dedicated hardware, or as a virtualized function instantiated on an appropriate platform, e.g. on a cloud infrastructure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
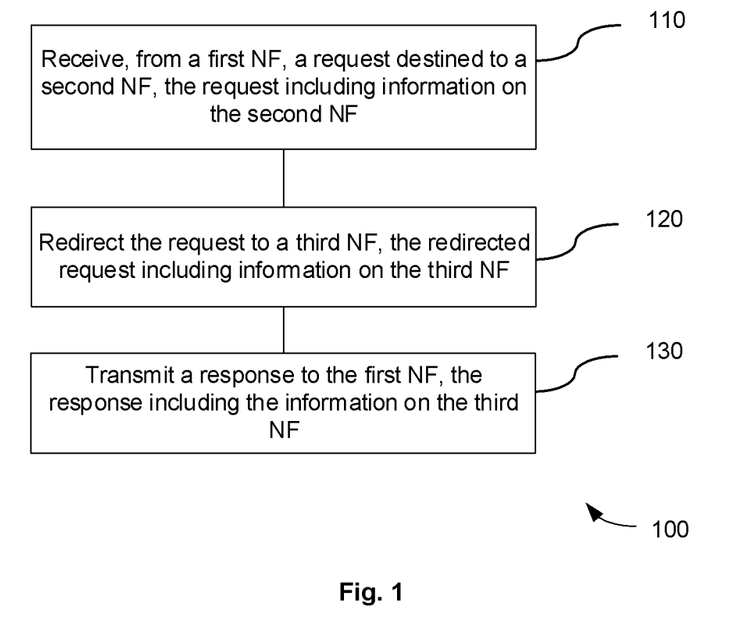
FIG. 1 is a flowchart illustrating a method in an SCP according to an embodiment of the present disclosure.

FIG. 1 is a flowchart illustrating a method 100 according to an embodiment of the present disclosure. The method 100 can be performed at an SCP or a network node implementing an SCP function.

At block 110, a request is received, from a first NF (e.g., an NF sender or HTTP client). The request is destined to a second NF (e.g., an NF receiver or HTTP server) and includes information on the second NF (e.g., an apiRoot of the second NF).

Here, the request may be a request to update a resource at the second NF or a notification request.

In an example, the request may contain a URI having an API root of the SCP. The apiRoot of the second NF can be carried in a 3gpp-Sbi-Target-apiRoot header.

For example, the request may be "POST https://scp.com/1/2/3/nsmf-pdusession/v1/sm-contexts/{smContextRef}/modify" (where "1/2/3" is the "apiPrefix" of the SCP), with the "3gpp-sbi-target-apiRoot" header set to the apiRoot of the second NF, e.g., "https://example.com/a/b/c".

Here, an "apiRoot" refers to a combination of "scheme", "authority" and "apiPrefix".

At block 120, the request is redirected to a third NF (e.g., another NF receiver or HTTP server). The redirected request includes information on the third NF (e.g., apiRoot of the third NF). The apiRoot of the third NF may be carried in a URI in the redirected request. Referring to the above example, the redirected request may be e.g., "POST https://example.com/d/e/f/nsmf-pdusession/v1/sm-contexts/{smContextRef}/10 modify", without any "3gpp-sbi-target-apiRoot" header, where "https://example.com/d/e/f" is the apiRoot of the third NF.

In the block 120, the third NF may be reselected as a receiver of the request in response to failure, load balancing, or load rebalancing associated with the second NF, or any other similar situations. Here, the SCP can reselect the third NF by performing a discovery towards an NRF. The reselecting may be performed based on a binding indication associated with the second NF.

Alternatively, the redirecting in the block 120 may be performed in response to an indication from the second NF indicating redirection to the third NF. The indication may further indicate the apiRoot of the third NF. For example, the indication can be, or can be carried in, a 308 redirection response.

At block 130, a response is transmitted to the first NF. The response includes the information on the third NF (e.g., apiRoot of the third NF). The apiRoot of the third NF can be carried in a header, e.g., a 3gpp-Sbi-Target-apiRoot header, in the response. In the above example, the response may contain a "3gpp-sbi-target-apiRoot" header set to "https://example.com/d/e/f". Alternatively, the apiRoot of the third NF can be carried in a URI in an attribute in a JavaScript Object Notation (JSON) body of the response. The SCP may receive the response from the third NF and forward it to the first NF.

Figure 2:
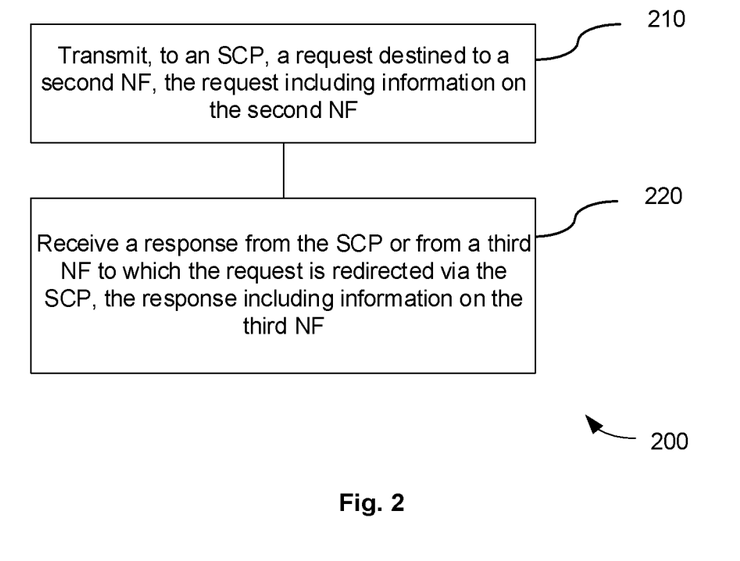
FIG. 2 is a flowchart illustrating a method in a first NF according to an embodiment of the present disclosure.

FIG. 2 is a flowchart illustrating a method 200 according to an embodiment of the present disclosure. The method 200 can be performed at a first NF (e.g., an NF sender or HTTP client) or a network node implementing the first NF.

At block 210, a request is transmitted to an SCP. The request is destined to a second NF (e.g., an NF receiver or HTTP server) and includes information on the second NF (e.g., an apiRoot of the second NF).

Here, the request may be a request to update a resource at the second NF or a notification request.

In an example, the request may contain a URI having an API root of the SCP. The apiRoot of the second NF can be carried in a 3gpp-Sbi-Target-apiRoot header. For example, the request may be "POST https://scp.com/1/2/3/nsmf-pdusession/v//sm-contexts/{smContextRef}/modify" (where "1/2/3" is the "apiPrefix" of the SCP), with the "3gpp-sbi-target-apiRoot" header set to the apiRoot of the second NF, e.g., "https://example.com/a/b/c".

At block 220, a response is received from the SCP, or from a third NF (e.g., another NF receiver or HTTP server) to which the request is redirected via the SCP. The response includes information on the third NF (e.g., apiRoot of the third NF).

In an example, the apiRoot of the third NF can be carried in a header, e.g., a 3gpp-Sbi-Target-apiRoot header, in the response. In the above example, the response may contain a "3gpp-sbi-target-apiRoot" header set to the apiRoot of the third NF, e.g., "https://example.com/d/e/f. Alternatively, the apiRoot of the third NF can be carried in a URI in an attribute in a JSON body of the response.

Then, the first NF, being notified of the information the third NF, knows that the request has been redirected to the third NF and can use the information in subsequent requests. In an example, the first NF can transmit, to the SCP, a further request destined to the third NF. The further request includes the information on the third NF (e.g., apiRoot of the third NF). For example, the further request may be e.g., https://scp.com/1/2/3/nsmf-pdusession/v//sm-contexts/{smContextRef}/modify", with the "3gpp-sbi-target-apiRoot" header set to the apiRoot of the third NF, e.g., "https://example.com/d/e/f".

Figure 3:
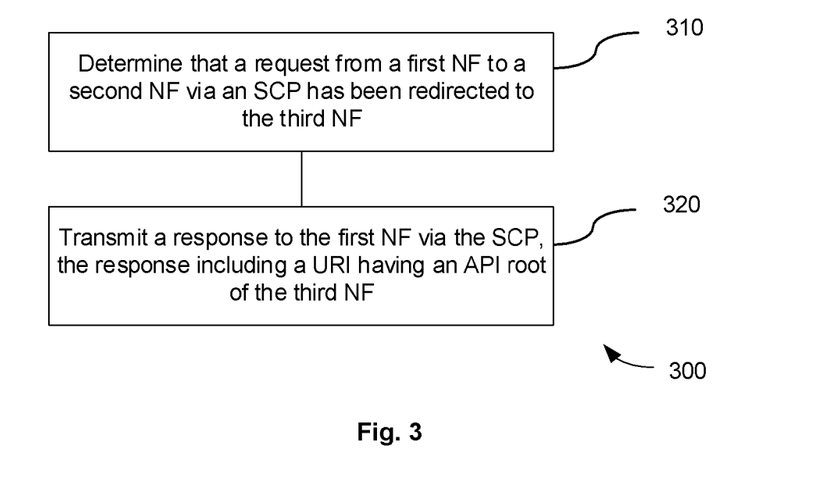
FIG. 3 is a flowchart illustrating a method in a third NF according to another embodiment of the present disclosure.

FIG. 3 is a flowchart illustrating a method 300 according to an embodiment of the present disclosure. The method 300 can be performed at a third NF (e.g., an NF receiver or HTTP server) or a network node implementing the third NF.

At block 310, it is determined that a request from a first NF (e.g., an NF sender or HTTP client) to a second NF (e.g., an NF receiver or HTTP server) via an SCP has been redirected to the third NF, e.g., due to reselection by the SCP or redirection by the second NF.

At block 320, a response is transmitted to the first NF via the SCP. The response includes a URI having an apiRoot of the third NF. When the third NF knows that there is a request redirection or a resource relocation (i.e., the resource is restored from backend), it can include the URI having the apiRoot of the third NF in an attribute in a JSON body of the response.

Some exemplary embodiments of the present disclosure will be described below.

The 3gpp-Sbi-Target-apiRoot header as specified in TS 29.500 can be used by an SCP to indicate the apiRoot of the target URI if a new HTTP server is selected or reselected and there is no Location header included in the response. The definition of the "3gpp-Sbi-Target-apiRoot" header in Table 5.2.3.2.1-1 of TS 29.500 can be extended to support the above feature, as shown in Table 2 below.

as HTTP client, unless the SCP did not change the target URI when forwarding the request from the NF as HTTP client to the NF as HTTP server. The NF as HTTP client can update the locally stored URI (e.g. resource URI or notification callback URI) used in the request with the target apiRoot received in the HTTP response, and thus send subsequent request to the updated target URI.

In the following, the above methods 100-300 will be further explained with reference to illustrative examples shown in FIGS. 4-5.

Figure 4:
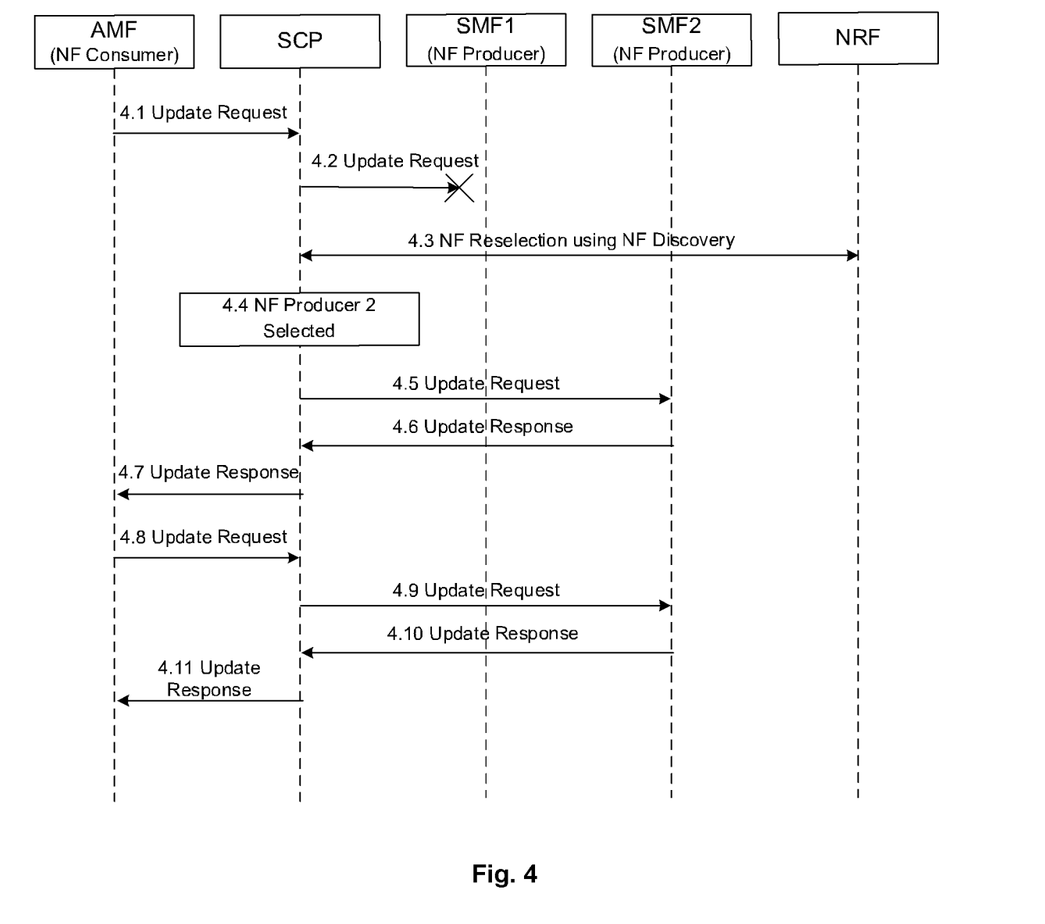
FIG. 4 is a sequence diagram showing an exemplary process for indirect communication according to an embodiment of the present disclosure.

FIG. 4 is a sequence diagram showing an exemplary process for indirect communication according to an embodiment of the present disclosure. In this example, a request is redirected due to reselection of an NF receiver by an SCP.

As shown, at 4.1, an AMF, as an NF sender (also an NF consumer and HTTP client) in this case, sends an update request to an SCP. The update request is destined to an SMF (denoted as SMF1) as an NF receiver (also an NF producer and HTTP server) in this case. The update request can be e.g., an Update SM Context Request for updating a PDU SM context that has already been created at SMF1. The Update SM Context Request may contain a URI "{apiRoot of SCP}/nsmf-pdusession/v1/sm-contexts/{SmContextRef}", with a "3gpp-sbi-target-apiRoot" header set to {apiRoot of SMF1}. At 4.2, the SCP forwards the update request to SMF1. The forwarded request here may be e.g., {apiRoot of SMF1}/nsmf-pdusession/v1/sm-contexts/{SmContextRef}. However, the forwarding at 4.2 fails, e.g., due to failure of SMF1. At 4.3, the SCP performs an NF discovery towards an NRF for NF receiver reselection (e.g., based on a binding indication associated with SMF1). At 4.4, the SCP reselects another SMF (denoted as SMF2) as a new NF receiver, and acquires an apiRoot of SMF2 from an NF profile retrieved from the NRF. At 4.5, the SCP forwards the update request to SMF2. The forwarded request here may be e.g., {apiRoot of SMF2}/nsmf-pdusession/v1/sm-contexts/{SmContextRef}. At 4.6, the SCP receives an update response (e.g., an Update SM Context Response) from SMF2. At 4.7, the SCP forwards the update response to the AMF. The forwarded

TABLE 2

Mandatory HTTP custom headers

| Name | Reference | Description |
| --- | --- | --- |
| 3gpp-Sbi-Target-apiRoot | Clause 5.2.3.2.4 | This header is used by an HTTP client to indicate the apiRoot of the target URI when communicating indirectly with the HTTP server via an SCP, and used by SCP to indicate the apiRoot of the target URI if a new HTTP server is selected or reselected and there is no Location header included in the response. This header may also be used by an HTTP client to indicate the apiRoot of the target URI towards HTTP server in another PLMN via the SEPP, when TLS is used between the SEPPs. |

The 3gpp-Sbi-Target-apiRoot header as specified in TS 29.500 can contain the apiRoot of the selected or changed target URI in a response sent to an HTTP client, when SCP selected or reselected a new HTTP server to route the request and no Location HTTP header is included in the HTTP response.

If no "Location" header is included in an HTTP response (e.g., to an subsequent service request towards a created resource), the SCP shall include a "3gpp-Sbi-Target-apiRoot" header with value set to the apiRoot of the target HTTP server when forwarding the HTTP response to the NF response here may include a "3gpp-sbi-target-apiRoot" header set to {apiRoot of SMF2}.

At 4.8, the AMF sends a further update request (e.g., Update SM Context Request) to the SCP. The Update SM Context Request may contain a URI "{apiRoot of SCP}/nsmf-pdusession/v1/sm-contexts/{smContextRef}", with a "3gpp-sbi-target-apiRoot" header set to {apiRoot of SMF2}. At 4.9, the SCP forwards the update request to SMF2. The forwarded request here may be e.g., {apiRoot of SMF2}/nsmf-pdusession/v1/sm-contexts/{smContextRef}. At 4.10, the SCP receives an update response (e.g., an Update SM Context Response) from SMF2. At 4.11, the SCP forwards the update response to the AMF.

Figure 5:
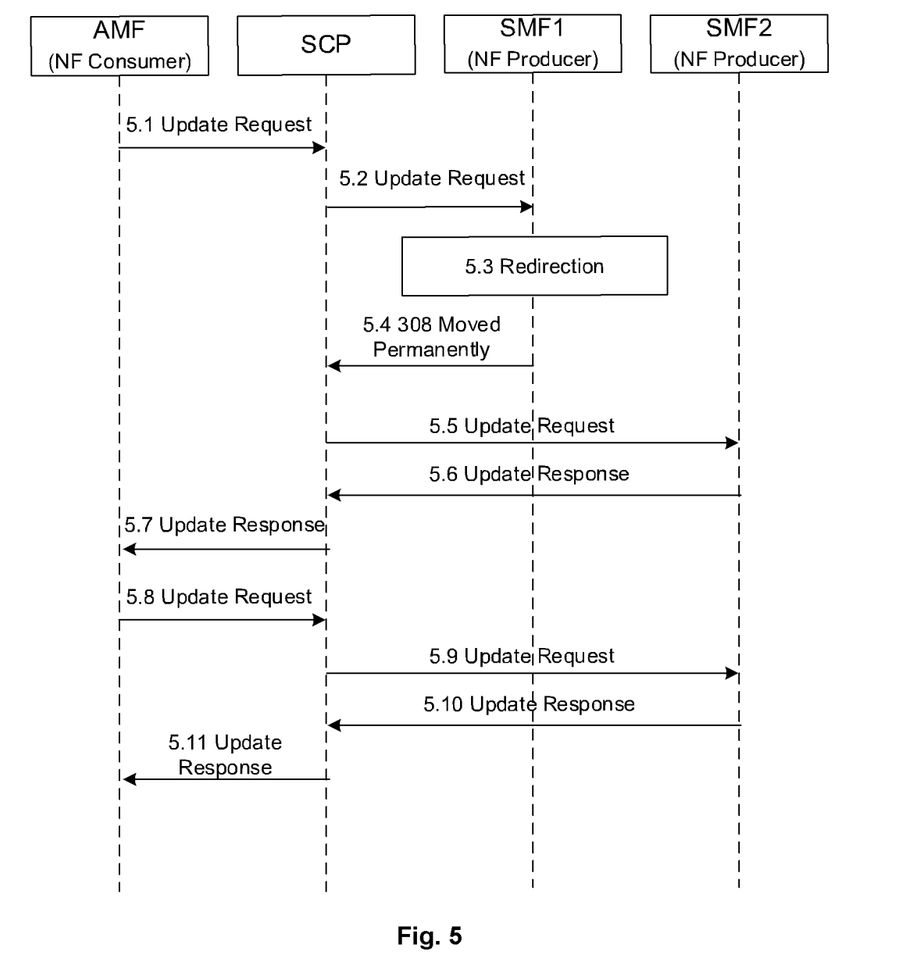
FIG. 5 is a sequence diagram showing an exemplary process for indirect communication according to another embodiment of the present disclosure.

FIG. 5 is a sequence diagram showing an exemplary process for indirect communication according to an embodiment of the present disclosure. In this example, a request is redirected due to redirection by an NF receiver.

As shown, at 5.1, an AMF, as an NF sender (also an NF consumer and HTTP client) in this case, sends an update request to an SCP. The update request is destined to an SMF (denoted as SMF1) as an NF receiver (also an NF producer and HTTP server) in this case. The update request can be e.g., an Update SM Context Request for updating a PDU SM context that has already been created at SMF1. The Update SM Context Request may contain a URI "{apiRoot of SCP}/nsmf-pdusession/v1/sm-contexts/{smContextRef}", with a "3gpp-sbi-target-apiRoot" header set to {apiRoot of SMF1}. At 5.2, the SCP forwards the update request to SMF1. The forwarded request here may be e.g., {apiRoot of SMF1}/nsmf-pdusession/v1/sm-contexts/{smContextRef}. At 5.3, SMF1 decides to redirect the request to another SMF (denoted as SMF2) as a new NF receiver. At 5.4, SMF1 sends to the SCP a 308 Moved Permanently response containing a Location header indicating {apiRoot of SMF2}/nsmf-pdusession/v1/sm-contexts/{smContextRef}. At 5.5, the SCP forwards the update request to SMF2 based on the response received at 5.3. The forwarded request here may be e.g., {apiRoot of SMF2}/nsmf-pdusession/v1/sm-contexts/{smContextRef}. At 5.6, the SCP receives an update response (e.g., an Update SM Context Response) from SMF2. At 5.7, the SCP forwards the update response to the AMF. The forwarded response here may include a "3gpp-sbi-target-apiRoot" header set to {apiRoot of SMF2}.

At 5.8, the AMF sends a further update request (e.g., Update SM Context Request) to the SCP. The Update SM Context Request may contain a URI "{apiRoot of SCP}/nsmf-pdusession/v1/sm-contexts/{SmContextRef}", with a "3gpp-sbi-target-apiRoot" header set to {apiRoot of SMF2}. At 5.9, the SCP forwards the update request to SMF2. The forwarded request here may be e.g., {apiRoot of SMF2}/nsmf-pdusession/v1/sm-contexts/{SmContextRef}. At 5.10, the SCP receives an update response (e.g., an Update SM Context Response) from SMF2. At 5.11, the SCP forwards the update response to the AMF.

Figure 6:
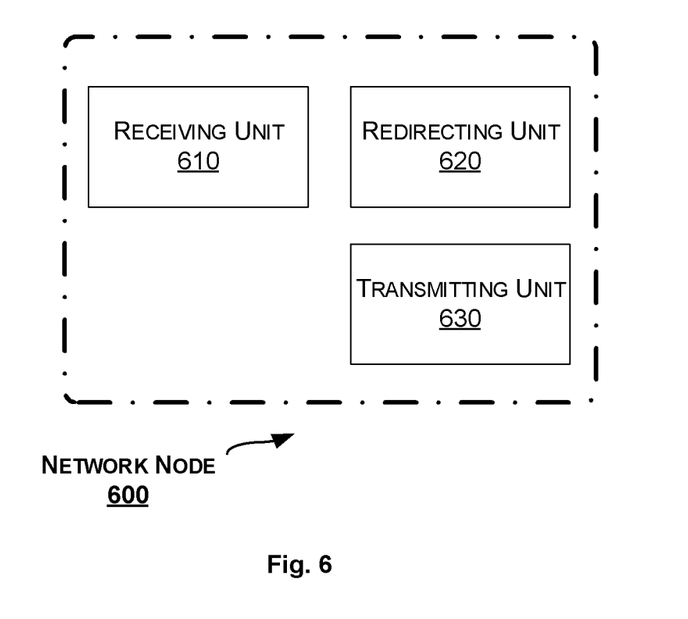
FIG. 6 is a block diagram of a network node according to an embodiment of the present disclosure.

Correspondingly to the method 100 as described above, a network node is provided. FIG. 6 is a block diagram of a network node 600 according to an embodiment of the present disclosure. The network node 600 can be configured to implement an SCP function.

As shown in FIG. 6, the network node 600 includes a receiving unit 610 configured to receive, from a first NF, a request destined to a second NF, the request including information on the second NF. The network node 600 further includes a redirecting unit 620 configured to redirect the request to a third NF, the redirected request including information on the third NF. The network node 600 further includes a transmitting unit 630 configured to transmit a response to the first NF, the response including the information on the third NF.

In an embodiment, the request may be a request to update a resource at the second NF or a notification request.

In an embodiment, the information on the third NF may indicate an API root of the third NF.

In an embodiment, the information on the third NF may be carried in a URI in the redirected request or in a header in the response.

In an embodiment, the header may be a 3gpp-Sbi-Target-apiRoot header.

In an embodiment, the request destined to the second NF may contain: a URI having an API root of the SCP. The information on the second NF may indicate an API root of the second NF and may be carried in a 3gpp-Sbi-Target-apiRoot header.

In an embodiment, the redirecting unit 620 may be configured to reselect the third NF as a receiver of the request in response to failure, load balancing, or load rebalancing associated with the second NF, or may be configured to redirect the request to the third NF in response to an indication from the second NF indicating redirection to the third NF.

In an embodiment, the redirecting unit 620 may be configured to reselect the third NF by performing a discovery towards an NRF, and/or reselect the third NF based on a binding indication associated with the second NF. The indication may further indicate the API root of the third NF.

In an embodiment, the first NF or second NF may be one of an HTTP server, an HTTP client, an NF service producer, or an NF service consumer.

The units 610-630 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 7:
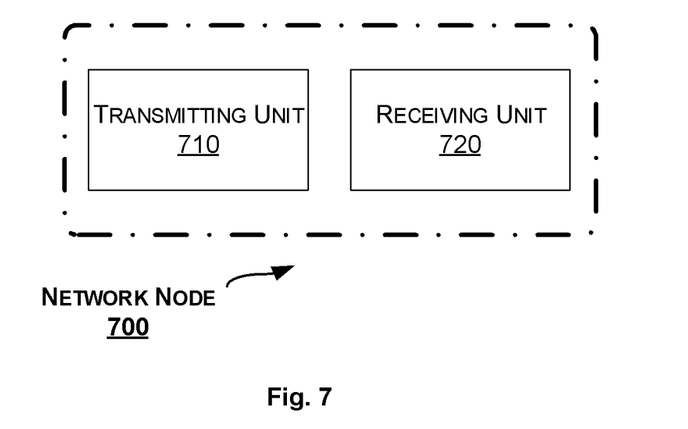
FIG. 7 is a block diagram of a network node according to an embodiment of the present disclosure.

Correspondingly to the method 200 as described above, a network node is provided. FIG. 7 is a block diagram of a network node 700 according to an embodiment of the present disclosure. The network node 700 can be configured to implement a first NF (e.g., an NF sender or HTTP client).

As shown in FIG. 7, the network node 700 includes a transmitting unit 710 configured to transmit, to an SCP, a request destined to a second NF, the request including information on the second NF. The network node 700 further includes a receiving unit 720 configured to receive a response from the SCP or from a third NF to which the request is redirected via the SCP, the response including information on the third NF.

In an embodiment, the request may be a request to update a resource at the second NF or a notification request.

In an embodiment, the information on the third NF may indicate an API root of the third NF.

In an embodiment, the information on the third NF may be carried in a URI or in a header in the response.

In an embodiment, the header may be a 3gpp-Sbi-Target-apiRoot header.

In an embodiment, the request destined to the second NF may contain: a URI having an API root of the SCP. The information on the second NF may indicate an API root of the second NF and may be carried in a 3gpp-Sbi-Target-apiRoot header.

In an embodiment, the network node 700 may further include a transmitting unit configured to transmit, to the SCP, a further request destined to the third NF. The further request may include the information on the third NF.

The units 710-720 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 8:
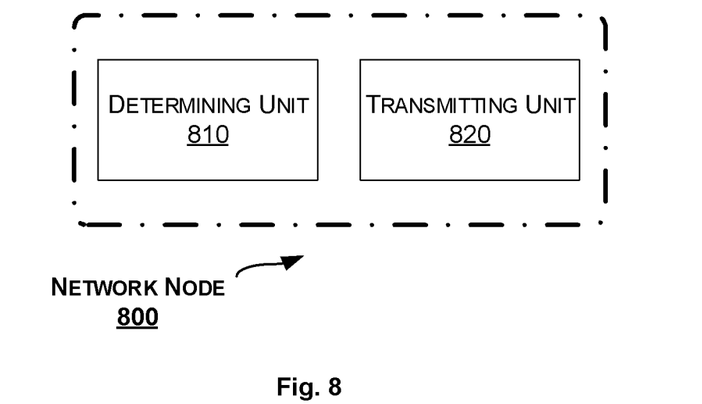
FIG. 8 is a block diagram of a network node according to an embodiment of the present disclosure.

Correspondingly to the method 300 as described above, a network node is provided. FIG. 8 is a block diagram of a network node 800 according to an embodiment of the present disclosure. The network node 800 can be configured to implement a third NF (e.g., NF receiver or HTTP server).

As shown in FIG. 8, the network node 800 includes a determining unit 810 configured to determine that a request from a first NF to a second NF via an SCP has been redirected to the third NF. The network node 800 further includes a transmitting unit 820 configured to transmit a response to the first NF via the SCP, the response including a URI having an API root of the third NF.

The units 810-820 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 9:
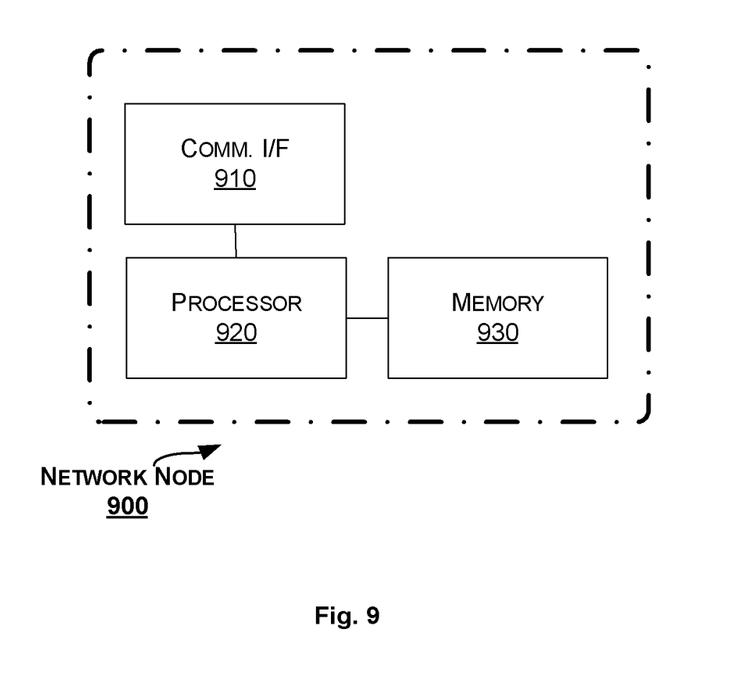
FIG. 9 is a block diagram of a network node according to another embodiment of the present disclosure.

FIG. 9 is a block diagram of a network node 900 according to another embodiment of the present disclosure.

The network node 900 includes a communication interface 910, a processor 920 and a memory 930.

The memory 930 may contain instructions executable by the processor 920 whereby the network node 900 is operative to, when implementing an SCP function, perform the actions, e.g., of the procedure described earlier in conjunction with FIG. 1. Particularly, the memory 930 may contain instructions executable by the processor 920 whereby the network node 900 is operative to, when implementing an SCP function: receive, from a first NF, a request destined to a second NF, the request including information on the second NF; redirect the request to a third NF, the redirected request including information on the third NF; and transmit a response to the first NF, the response including the information on the third NF.

In an embodiment, the request may be a request to update a resource at the second NF or a notification request.

In an embodiment, the information on the third NF may indicate an API root of the third NF.

In an embodiment, the information on the third NF may be carried in a URI in the redirected request or in a header in the response.

In an embodiment, the header may be a 3gpp-Sbi-Target-apiRoot header.

In an embodiment, the request destined to the second NF may contain: a URI having an API root of the SCP. The information on the second NF may indicate an API root of the second NF and may be carried in a 3gpp-Sbi-Target-apiRoot header.

In an embodiment, the operation of redirecting may include reselecting the third NF as a receiver of the request in response to failure, load balancing, or load rebalancing associated with the second NF, or may be in response to an indication from the second NF indicating redirection to the third NF.

In an embodiment, the operation of reselecting may include performing a discovery towards an NF Repository Function (NRF), and/or may be based on a binding indication associated with the second NF. The indication may further indicate the API root of the third NF.

In an embodiment, the first NF or second NF may be one of an HTTP server, an HTTP client, an NF service producer, or an NF service consumer.

Alternatively, the memory 930 may contain instructions executable by the processor 920 whereby the network node 900 is operative to, when implementing a first NF, perform the actions, e.g., of the procedure described earlier in conjunction with FIG. 2. Particularly, the memory 930 may contain instructions executable by the processor 920 whereby the network node 900 is operative to, when implementing a first NF: transmit, to an SCP, a request destined to a second NF, the request including information on the second NF; and receive a response from the SCP or from a third NF to which the request is redirected via the SCP, the response including information on the third NF.

In an embodiment, the request may be a request to update a resource at the second NF or a notification request.

In an embodiment, the information on the third NF may indicate an API root of the third NF.

In an embodiment, the information on the third NF may be carried in a URI or in a header in the response.

In an embodiment, the header may be a 3gpp-Sbi-Target-apiRoot header.

In an embodiment, the request destined to the second NF may contain: a URI having an API root of the SCP. The information on the second NF may indicate an API root of the second NF and may be carried in a 3gpp-Sbi-Target-apiRoot header.

In an embodiment, the memory 930 may further contain instructions executable by the processor 920 whereby the network node 900 is operative to, when implementing the first NF: transmit, to the SCP, a further request destined to the third NF. The further request may include the information on the third NF.

Alternatively, the memory 930 may contain instructions executable by the processor 920 whereby the network node 900 is operative to, when implementing a third NF, perform the actions, e.g., of the procedure described earlier in conjunction with FIG. 3. Particularly, the memory 930 may contain instructions executable by the processor 920 whereby the network node 900 is operative to, when implementing a third NF: determine that a request from a first NF to a second NF via an SCP has been redirected to the third NF; and transmit a response to the first NF via the SCP, the response including a URI having an API root of the third NF.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 920 causes the network node 900 to perform the actions, e.g., of the procedure described earlier in conjunction with FIG. 1, 2, or 3.

The computer program product may be configured as a computer program code structured in computer program modules. The computer program modules could essentially perform the actions of the flow illustrated in FIG. 1, 2, or 3.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried in a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network node implementing a Service Communication Proxy, SCP, function, comprising:
   receiving, from a first Network Function, NF, a request destined to a second NF, wherein the request comprises information on the second NF;
   redirecting the request to a third NF, wherein the redirected request comprises information on the third NF; and
   transmitting a response from the SCP to the first NF, wherein the response comprises the information on the third NF, wherein, the information on the third NF indicates an Application Programming Interface, API, root of the third NF; and wherein, if there is no Location header included in the response, the API root of the third NF is indicated by using a 3gpp-Sbi-Target-apiRoot header.

2. The method of claim 1, wherein the request is a request to update a resource at the second NF or a notification request.

3. The method of claim 1, wherein the request destined to the second NF contains: a URI having an API root of the SCP, and the information on the second NF indicates an API root of the second NF and is carried in a 3gpp-Sbi-Target-apiRoot header.

4. The method of claim 1, wherein said redirecting comprises reselecting the third NF as a receiver of the request in response to failure, load balancing, or load rebalancing associated with the second NF, or is in response to an indication from the second NF indicating redirection to the third NF.

5. The method of claim 4, wherein
   said reselecting comprises performing a discovery towards an NF Repository Function, NRF, and/or is based on a binding indication associated with the second NF, or the indication further indicates the API root of the third NF.

6. The method of claim 1, the first NF or second NF is one of a Hyper Text Transfer Protocol, HTTP, server, an HTTP client, an NF service producer, or an NF service consumer.

7. A method in a first Network Function, NF, comprising:
   transmitting, to a Service Communication Proxy, SCP, a request destined to a second NF, wherein the request comprises information on the second NF; and
   receiving a response from the SCP or from a third NF to which the request is redirected via the SCP, wherein the response comprises information on the third NF, wherein the information on the third NF indicates an Application Programming Interface, API, root of the third NF; and wherein if there is no Location header included in the response, the API root of the third NF is indicated by using a 3gpp-Sbi-Target-apiRoot header.

8. The method of claim 7, wherein the request is a request to update a resource at the second NF or a notification request.

9. The method of claim 7, wherein the request destined to the second NF contains: a URI having an API root of the SCP, and the information on the second NF indicates an API root of the second NF and is carried in a 3gpp-Sbi-Target-apiRoot header.

10. The method of claim 7, further comprising:
    transmitting, to the SCP, a further request destined to the third NF, wherein the further request comprises the information on the third NF.

11. A method in a third Network Function, NF, comprising:
    determining that a request from a first NF to a second NF via a Service Communication Proxy, SCP, has been redirected to the third NF; and
    transmitting a response to the first NF via the SCP, wherein the response comprises an Application Programming Interface, API, root of the third NF, wherein the API root of the third NF is indicated by using a 3gpp-Sbi-Target-apiRoot header if there is no Location header included in the response.

* * * * *